Patented Oct. 1, 1929

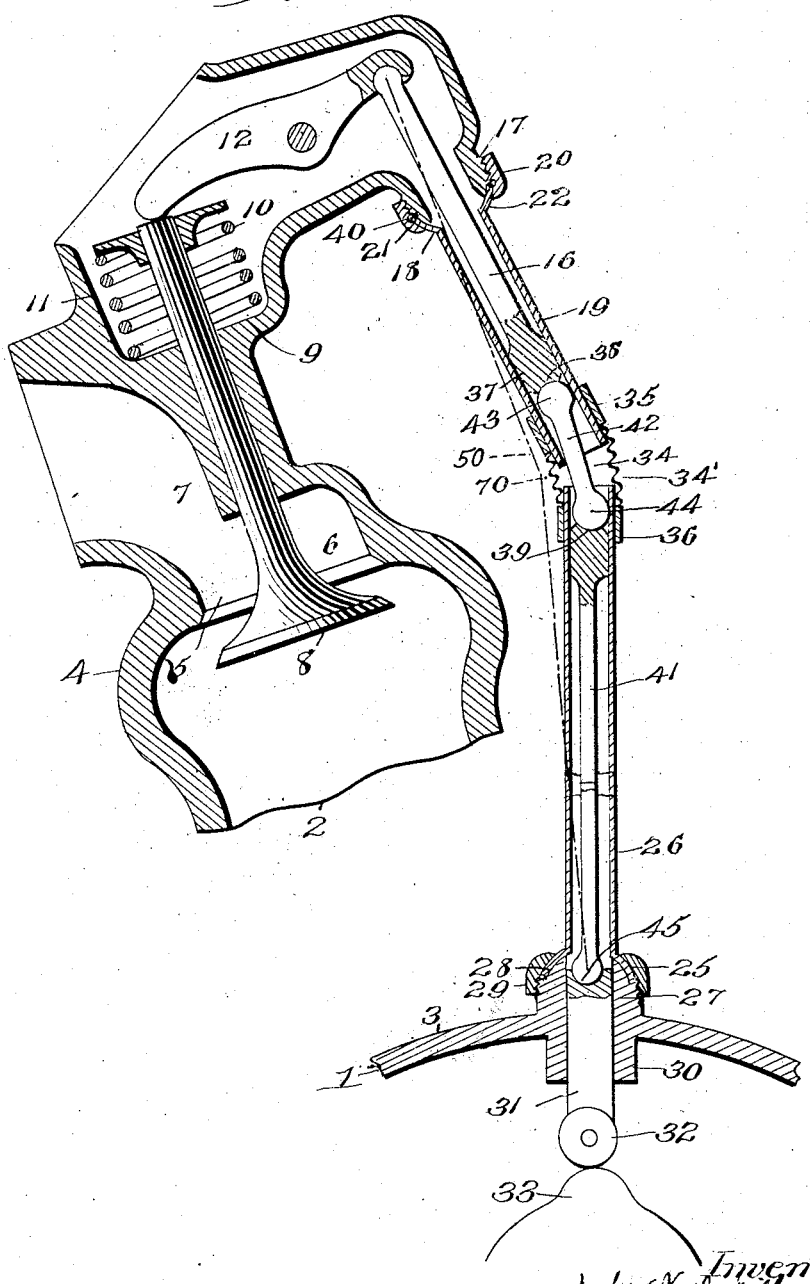

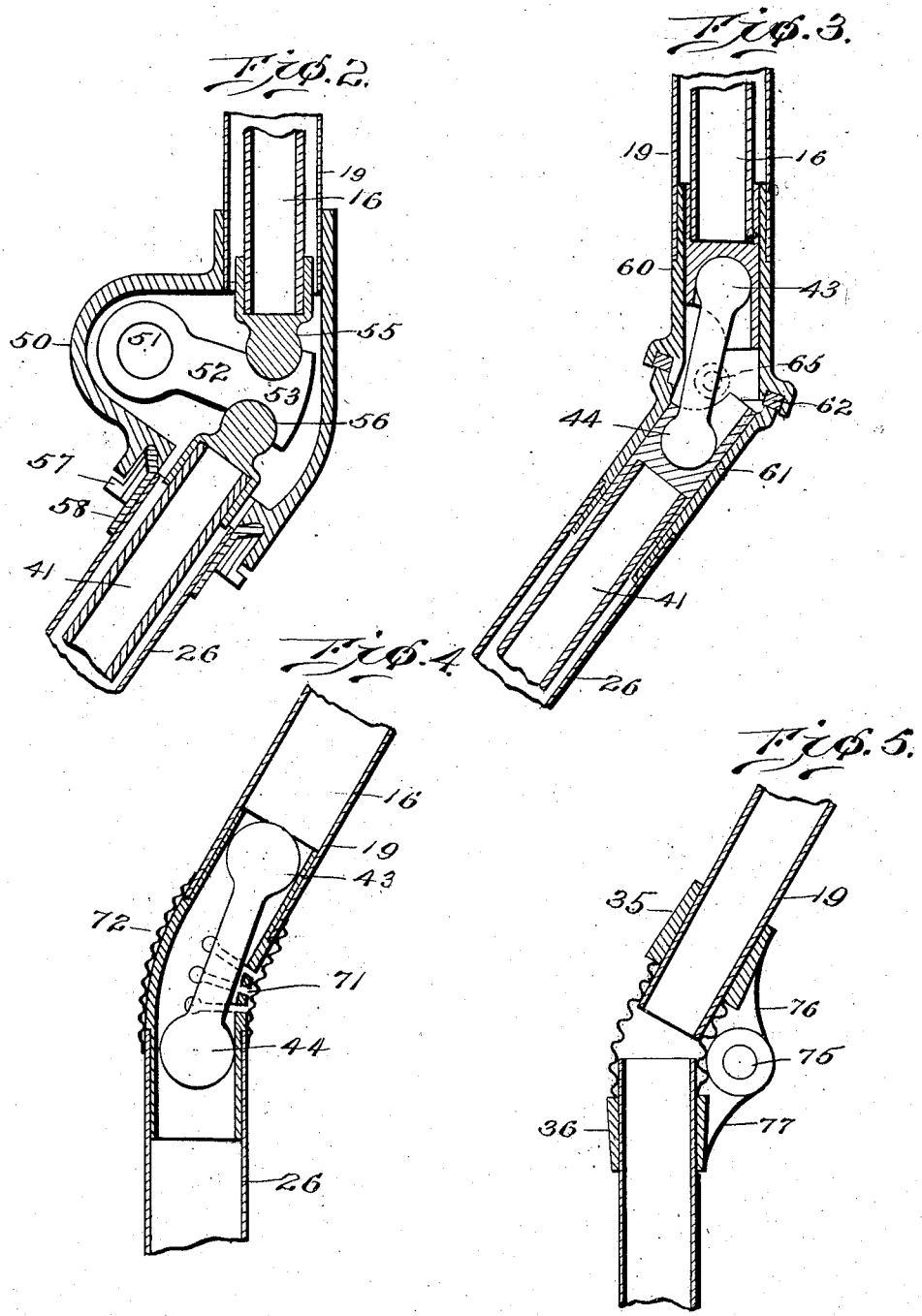

1,729,849

UNITED STATES PATENT OFFICE

ANDREW V. D. WILLGOOS, OF WEST HARTFORD, CONNECTICUT, ASSIGNOR TO THE PRATT & WHITNEY AIRCRAFT COMPANY, OF HARTFORD, CONNECTICUT

CONSTANT-CLEARANCE VALVE MECHANISM

Application filed December 7, 1926. Serial No. 153,166.

This invention relates in general to internal combustion engines and more particularly to means for maintaining constant valve clearance therein in defeat of differential expansion due to variance in the degree of temperatures attained by parts of the valve-actuating mechanism and other parts of the engine.

In internal combustion engines the clearance between the various parts of the valve operating train changes with conditions of operation. In the conventional aircooled motor the push-rods for operating the valve mechanism are usually exposed, to a greater or less degree to the cooling air, and, since they are usually spaced from the cylinder and the combustion chamber, fail to attain the high degree of temperature reached by the cylinder proper. The resulting difference in expansion of these parts causes a considerable variance in the clearance of the valve and seriously affects the performance of the engine.

It is an object of my invention to provide a valve actuating train including means for compensating for differential expansion due to inequalities in temperature and in the inherent characteristics of the materials employed.

It is a further object of my invention to provide an improved push-rod train and housing cooperating to insure a constant valve clearance.

Other objects of my invention will appear in the accompanying specification and claims and will be disclosed in the accompanying drawings, in which—

Figure 1 is a central vertical section through a portion of an aircooled engine embodying my invention, with portions of the structure shown broken away;

Figure 2 is a detail, partly in section, showing a modification of my push-rod housing joint and push-rod train;

Figures 3, 4 and 5 are details, partly in section of modifications of the joint of my push-rod train and housing.

Referring now with greater particularity to the drawings and having reference, first, to Figure 1 it will be seen that my invention is comprised as follows:

The engine 1 has a plurality of cylinders 2, only a part of one of which is shown, mounted on the crank-case 3. The cylinder is provided with the usual cylinder head 4, valve ports and valve seats 6. Formed integrally with the head of the engine cylinder are valve bosses or guides 7 in which the valves 8 are reciprocated. Only the structure of the mechanism for operating one valve will be described. An extension 11 of the upper end of the boss 7 is formed to provide a seat 9 for the valve spring 10 and a housing and mount for the rocker arm 12. The extension 11 has a bore for receiving one of the push-rod members 16 and has a depending externally screw-threaded projection 17 surrounding said bore. The end of the extension is rounded off at 18 below its screw-threads to a smooth fit with the arcuate upper end 22 of the push-rod housing 19. A suitable gland 20, having an inner face 21 curved to correspond to the curvature of the housing end 22, is adapted to be screwed onto the extension 17 to hold the push rod housing in place though permitting a very limited oscillatory movement on the rounded extension end 18. Suitable resilient packing 40 may be provided to prevent escape of oil from the housing.

The crank-case 3 has a somewhat similar structure for holding the lower end 25 of the push-rod housing 26. The crank-case is formed with projection 27 having a similarly rounded end 28 and a gland 29 screw-threadedly engaging said extension. The crank-case at this extension is formed to provide a cylindrical guide or boss 30 for the shank 31 of a cam follower 32 whose roller follows the surface of the valve actuating cam 33. The housing portions 19 and 26 are hinged at 34 and a resiliently flexible member 34', secured to the said housing portion collars 35 and 36, respectively, is provided to prevent escape of oil and ingress of dirt, etc. The lower end 37 of the push-rod member 16 is provided with a socket 38, while a similar socket 39 is provided in the upper end 41' push-rod member 41. A link 42 terminating in ball shaped ends 43 and 44 fitting in sockets 38 and 39, is provided between the push-rod members 16 and 41.

The upper end of the push rod member 16 is ball-shaped to fit a ball socket in one end of the rocker arm 12; while the lower end of the push-rod member 41 is ball-shaped to fit a ball socket 45 in the upper end of the cam follower shank 31. The push-rod members 16 and 41 have a sliding fit adjacent their extremities 37 and 41', within their respective housings.

From the foregoing it will be seen that my device operates as follows:

When the engine is in operation the temperature of the cylinder rises and the resultant expansion causes the projections 17 and 27 to separate. In the conventional engine this would result in increased clearance between the rocker arm and the valve stem. However, in the structure disclosed in my invention, the push-rod housing members must follow their terminal supports and there assume a new position as indicated by the dotted line 50. This movement tends to align the push rod members and maintains the clearance between the rocker arm and the valve stem constant regardless of the relative expansion or contraction of the various parts.

In Figure 2, I have disclosed a modified type of joint for my push rod housing members. In this structure the push rod members 16 and 41 are shown as hollow rods provided with caps 55 and 56 terminating in ball shaped ends adapted to fit within the complementary recesses 53 and 54 formed in a member 52 pivotally connected at 51, to a supplementary housing member 50. The housing member 19, in this structure, is fixedly secured to the member 50, while the housing member 26 is provided with a flanged end 58, held in position by a gland 57, and so arranged as to permit a limited play between the members 26 and 50 to take care of the change in angularity of the housings due to differential expansion. Upon differential expansion the degree of angularity between the housing 26 and the casing 50 will be lessened with the consequent compensating lengthening of the push rod train.

In the structure shown in Figure 3, the push rod members 16 and 41 are again shown as of tubular structure having caps secured thereto provided with ball shaped recesses. The housings 19 and 26 are provided with extensions 60 and 61, respectively, which are hingedly connected at 65, and which have their circumferences spaced by a flexible packing 62. A link 66, having ball shaped ends 43 and 44 is positioned between the push rod housing members. Differential expansion of the engine parts will result in a tendency to align the housing members 19 and 26 with the consequential compensating increased effective length of the push rod train.

In the structure shown in Figure 4, the housing members 19 and 26 are shown as connected to a tubular member 70 which is cut away at slots 71 to increase its flexibility. In this structure a link 43, having ball shaped ends, is interposed between the ends of the push rod members 16 and 41. In this structure, differential expansion of the engine parts results in flexing the member 70, tending to straighten the same, and consequentially straightening and thereby lengthening the push rod train. A suitable flexible casing 72 is provided to prevent escape of oil and ingress of dirt.

In Figure 5 the push rod housing 19 and 26 have secured thereto collars 35 and 36 which are in turn secured to arms 76 and 77, respectively. The arms 76 and 77 are hingedly connected at 75 the hinge being placed at the side of, or in the angle of the housing. A flexible housing 34 is provided to prevent ingress of dirt and escape of oil.

It is found in some cases that improved compensation is obtained by this means. Expansion of the valve stem itself is not compensated for by the device shown in Figure 1, but by off-setting the hinge, as set forth in Figure 5, greater or less compensation can be secured, depending on the location of the hinge at one side or the other of the casing.

Having thus described my invention what I claim is—

1. In a valve actuating mechanism, a push-rod comprised of two or more portions disposed angularly with respect to each other, and means cooperating therewith tending to vary the angular disposition of said members under expansion due to heat.

2. In combination, in an internal combustion engine, a cylinder, a valve controlling the passage of gas to said cylinder, and mechanism for actuating said valve, said mechanism including a push-rod comprised of two or more members having a flexible driving connection and normally disposed angularly with respect to each other, and means cooperating with said push-rod members tending to vary the angular disposition of the same under expansion of said cylinder due to heat.

3. In combination, in an internal combustion engine, a cylinder, a valve controlling the passage of gas to said cylinder, and mechanism for actuating said valve, said mechanism including a push-rod comprised of two or more members having a flexible driving connection and normally disposed angularly with respect to each other, pivotally connected housings for said push-rod members, said housing tending to align said push-rod members upon expansion of said cylinder due to heat.

4. In combination, in an internal combustion engine, a crank-case having a valve actuating cam mounted therein, a cylinder mounted on said crank-case, a valve in said cylinder, valve actuating mechanism for operating said valve, said mechanism including two or more push rods member normally disposed angularly with respect to each other, a push-rod housing for one of said push-rod members secured to said cylinder and capable of limited oscillatory movement with respect thereto, a housing for one of said push-rod members secured to said crank-case and capable of limited oscillatory movement with respect thereto, said housings being so mounted and constructed as to tend to bring said push-rod members into alignment upon expansion of said cylinder.

5. In combination, in an internal combustion engine, a crank-case having a valve actuating cam mounted therein, a cylinder mounted on said crank-case, a valve in said cylinder, valve actuating mechanism for operating said valve, said mechanism including two or more push-rod members normally disposed angularly with respect to each other, a push-rod housing for one of said push-rod members secured to said cylinder and capable of limited oscillatory movement with respect thereto, a housing for one of said push-rod members secured to said crank-case and capable of limited oscillatory movement with respect thereto, said housings being hingedly connected to each other being so mounted and constructed as to tend to bring said push-rod members into alignment upon expansion of said cylinder.

6. In combination, in an internal combustion engine, a crank-case having a valve actuating cam mounted therein, a cylinder mounted on said crank-case, a valve in said cylinder, valve actuating mechanism for operating said valve, said mechanism including two or more push-rod members normally disposed angularly with respect to each other, a push-rod housing for one of said push-rod members secured to said cylinder and capable of limited oscillatory movement with respect thereto, a housing for one of said push-rod members secured to said crank-case and capable of limited oscillatory movement with respect thereto, said housings being hingedly connected to each other being so mounted and constructed as to tend to bring said push-rod members into alignment upon expansion of said cylinder, and a flexible dirt proof casing between said housings.

7. In combination, in an internal combustion engine, a valve actuating mechanism including a push-rod comprised of two or more angularly disposed push-rod members having a flexible driving connection therebetween, and pivotally mounted housings for said push-rod members flexibly connected and adapted to change the angular relation of said push-rod members upon differential expansion between said engine and said valve actuating mechanism.

8. In a valve actuating mechanism, a cam, a cam follower, a valve, a push-rod between said cam follower and said valve, comprised of two or more parts disposed at angles to each other, and means cooperating with said push-rod to maintain a constant relation between the movements of said cam follower and said valve, in defeat of changes in the distance between cam and valve.

9. In an internal combustion engine, a valve actuating train including an articulated push-rod, and pivotally mounted housings for said push-rod flexibly connected and adapted to change the effective length of said push-rod in defeat of differential expansion between said engine and said valve actuating train.

10. In a valve actuating mechanism, a cam follower, a valve rocker, supports for said follower and rocker, an articulated push-rod operatively disposed between said follower and said rocker, and means co-operating with said push-rod to compensate for movement of said supports relative to each other.

11. In a valve actuating mechanism, a cam, a valve, elements for transmitting the motion of said cam to said valve, including an articulated push-rod and means cooperating with said push-rod for maintaining constant the total clearance between said transmitting elements.

In testimony whereof I affix my signature.
ANDREW V. D. WILLGOOS.